(12) United States Patent
Reining et al.

(10) Patent No.: US 12,308,013 B2
(45) Date of Patent: *May 20, 2025

(54) ELECTROMAGNETIC ACTUATOR FOR A DISPLAY WITH IMPROVED SPRING ARRANGEMENT AND OUTPUT DEVICE WITH SAID ACTUATOR

(71) Applicant: Sound Solutions International (Zhenjiang) Co., Ltd., Zhenjiang (CN)

(72) Inventors: Friedrich Reining, Vienna (AT); Christoph Schmauder, Vienna (AT); Gustav Otto, Vienna (AT); Michael Schoffmann, Baden (AT)

(73) Assignee: Sound Solutions International (Zhenjiang) Co., Ltd., Zhenjiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/585,976

(22) Filed: Feb. 23, 2024

(65) Prior Publication Data

US 2024/0203389 A1  Jun. 20, 2024

Related U.S. Application Data

(63) Continuation of application No. 16/931,355, filed on Jul. 16, 2020, now Pat. No. 11,948,549.

(30) Foreign Application Priority Data

Jul. 17, 2019  (AT) .............................. A 50643/2019
Jan. 10, 2020  (AT) .............................. A 50013/2020
(Continued)

(51) Int. Cl.
*G10K 9/13* (2006.01)
*F16F 1/02* (2006.01)
(Continued)

(52) U.S. Cl.
CPC ................ *G10K 9/13* (2013.01); *F16F 1/021* (2013.01); *F16F 1/326* (2013.01); *G06F 1/1605* (2013.01);
(Continued)

(58) Field of Classification Search
CPC .. G10K 9/13; F16F 1/021; F16F 1/326; F16F 1/027; G06F 1/1605; G06F 3/16;
(Continued)

(56) References Cited

U.S. PATENT DOCUMENTS 5,828,767 A    10/1998  Button
6,377,145 B1 *  4/2002  Kumagai ................. H04R 7/16
                                            335/274
(Continued)

FOREIGN PATENT DOCUMENTS

CN        1294832 A      5/2001
CN        1347628 A      5/2002
(Continued)

OTHER PUBLICATIONS

Hu Xiao-Fei et al. Development and Application Prospects of the Electromagnetic Brake. vol. 47, No. 4. Beijing Research Institute of Precise Mechanical and Electronic Control Equipment.
(Continued)

*Primary Examiner* — Angelica M McKinney
(74) *Attorney, Agent, or Firm* — Dykema Gossett PLLC

(57) ABSTRACT

The invention relates to an electromagnetic actuator, which is designed to be connected to a backside of a plate like structure and which comprises an annular coil arrangement and a magnet system being designed to generate a magnetic field transverse to the annular coil arrangement. The annular coil arrangement and the magnet system are connected to each other by a plurality of springs, which are arranged inside of the annular coil arrangement.

2 Claims, 5 Drawing Sheets

(30) Foreign Application Priority Data

May 20, 2020 (AT) .............................. A 50441/2020
May 20, 2020 (AT) .............................. A 50442/2020

(51) Int. Cl.
  F16F 1/32       (2006.01)
  G06F 1/16       (2006.01)
  G06F 3/16       (2006.01)
  H02K 41/035     (2006.01)
  H04R 1/00       (2006.01)
  H04R 1/02       (2006.01)
  H04R 9/00       (2006.01)
  H04R 9/02       (2006.01)
  H04R 9/04       (2006.01)
  H04R 9/06       (2006.01)

(52) U.S. Cl.
  CPC ........... G06F 3/16 (2013.01); H02K 41/0354 (2013.01); H04R 1/00 (2013.01); H04R 1/028 (2013.01); H04R 9/00 (2013.01); H04R 9/025 (2013.01); H04R 9/045 (2013.01); H04R 9/046 (2013.01); H04R 9/066 (2013.01); H04R 2440/01 (2013.01); H04R 2499/15 (2013.01)

(58) Field of Classification Search
  CPC ........... H02K 41/0354; H02K 41/0356; H02K 33/18; H02K 33/16; H04R 1/00; H04R 1/028; H04R 9/00; H04R 9/025; H04R 9/045; H04R 9/046; H04R 9/066; H04R 2440/01; H04R 2499/15; H04R 9/06; H04R 7/16; H01F 7/06
  See application file for complete search history.

(56) References Cited

U.S. PATENT DOCUMENTS

| | | | |
|---|---|---|---|
| 6,573,630 B2 * | 6/2003 | Morita | H02K 33/16 310/180 |
| 7,550,880 B1 | 6/2009 | Pusl | |
| 11,948,549 B2 * | 4/2024 | Reining | H04R 9/025 |
| 2003/0036364 A1 | 2/2003 | Chung | |
| 2003/0124990 A1 | 7/2003 | Kawano et al. | |
| 2003/0227225 A1 | 12/2003 | Kaneda et al. | |
| 2004/0001603 A1 | 1/2004 | Sahyoun | |
| 2007/0164616 A1 | 7/2007 | Kuwabara et al. | |
| 2007/0291976 A1 | 12/2007 | Kajiwara | |
| 2009/0174510 A1 | 7/2009 | Kim et al. | |
| 2010/0189284 A1 | 7/2010 | Kuze et al. | |
| 2010/0189304 A1 | 7/2010 | Ueda | |
| 2011/0197681 A1 | 8/2011 | Rieder et al. | |
| 2011/0249858 A1 | 10/2011 | Lee et al. | |
| 2014/0103751 A1 | 4/2014 | Mitsumi | |
| 2014/0241564 A1 | 8/2014 | Kang et al. | |
| 2014/0254191 A1 | 9/2014 | Yasuike et al. | |
| 2016/0249137 A1 | 8/2016 | Honda et al. | |
| 2017/0280216 A1 | 9/2017 | Lee et al. | |
| 2018/0279052 A1 | 9/2018 | Reining | |
| 2019/0092231 A1 | 3/2019 | Lee | |
| 2019/0208300 A1 | 7/2019 | Lee et al. | |
| 2019/0215603 A1 | 7/2019 | Timothy et al. | |
| 2019/0267881 A1 * | 8/2019 | Matsuyama | H02K 33/18 |
| 2020/0045466 A1 | 2/2020 | Song et al. | |
| 2020/0107132 A1 | 4/2020 | Concessi | |
| 2020/0137500 A1 | 4/2020 | Moenke et al. | |
| 2021/0099063 A1 | 4/2021 | Wasenczuk | |
| 2021/0368276 A1 | 11/2021 | Otto et al. | |
| 2021/0368277 A1 * | 11/2021 | Otto | H04R 9/025 |

FOREIGN PATENT DOCUMENTS

| | | |
|---|---|---|
| CN | 101007305 A | 8/2007 |
| CN | 101983514 A | 3/2011 |
| CN | 103731003 A | 4/2014 |
| CN | 205622865 U | 10/2016 |
| CN | 107750040 A | 3/2018 |
| CN | 108668198 A | 10/2018 |
| CN | 207968942 U | 10/2018 |
| CN | 110933569 A | 3/2020 |
| CN | 111131978 A | 3/2020 |
| CN | 113727258 A | 11/2021 |
| EP | 1310860 A1 | 5/2003 |
| EP | 2268060 A1 | 12/2010 |
| EP | 3226069 A2 | 10/2017 |
| EP | 3229063 A1 | 10/2017 |
| EP | 3229272 A1 | 10/2017 |
| GB | 0027278 | 12/2000 |
| JP | 2003211087 A | 7/2003 |
| KR | 20110004291 U | 4/2011 |
| WO | 0047013 A1 | 8/2000 |
| WO | 0067523 A2 | 11/2000 |
| WO | 0239781 A2 | 5/2002 |
| WO | 03067923 A2 | 8/2003 |
| WO | 2009133986 A1 | 11/2009 |
| WO | 2011104659 A2 | 9/2011 |
| WO | 2012032124 A1 | 3/2012 |
| WO | 2012042124 A1 | 4/2012 |
| WO | 2012129247 A2 | 9/2012 |
| WO | 2014073448 A1 | 5/2014 |
| WO | 2019185463 A1 | 10/2019 |

OTHER PUBLICATIONS

The Engineering ToolBox, Steels—Endurance Limits and Fatigue Stress, 2011 online. Available at https://www.engineeringtoolbox.com/steel-endurance-limit-d_1781.html Accessed Jan. 9, 2023 (Year: 2011).

Zhou Wen-Jie et al. Performance Analysis of Three Type Flexure Bearings for Linear Compressors. vol. 43, No. 1. Journal of Nanjing University of Aeronautics & Astronautics.

Austrian Patent Office; First Office Action issued in application No. A 50643/2019, dated Nov. 6, 2019.

Austrian Patent Office; First Office Action issued in application No. A 50013/2020, dated Sep. 29, 2020.

Austrian Patent Office; First Office Action issued in application No. A 50441/2020, dated Feb. 17, 2021.

Austrian Patent Office; First Office Action issued in application No. A 50442/2020, dated Feb. 17, 2021.

State Intellectual Property Office Prc. First Office Action and Search Report issued in Chinese application No. 202010702391.7, dated Jun. 28, 2021.

State Intellectual Property Office Prc. First Office Action and Search Report issued in Chinese application No. 202010702368.8, dated Jun. 25, 2021.

State Intellectual Property Office Prc. Office Action and Search Report issued in Chinese application No. 202010702368.8, dated Jan. 13, 2022.

State Intellectual Property Office Prc. Office Action and Search Report issued in Chinese application No. 202010702391.7, dated Jan. 13, 2022.

State Intellectual Property Office Prc. First Office Action and Search Report issued in Chinese application No. 202110546799.4, dated Jun. 16, 2023.

State Intellectual Property Office Prc. First Office Action and Search Report issued in Chinese application No. 202110548201.5, dated Jun. 29, 2023.

USPTO. Office Action issued in U.S. Appl. No. 16/931,372, dated Jul. 22, 2021.

USPTO. Office Action issued in U.S. Appl. No. 17/325,032, dated Nov. 1, 2022.

USPTO. Office Action issued in U.S. Appl. No. 17/325,046, dated Nov. 2, 2022.

* cited by examiner

US 12,308,013 B2

ELECTROMAGNETIC ACTUATOR FOR A DISPLAY WITH IMPROVED SPRING ARRANGEMENT AND OUTPUT DEVICE WITH SAID ACTUATOR

PRIORITY

This patent application is a continuation of U.S. patent application Ser. No. 16/931,355, filed on Jul. 16, 2020, which claims priority from Austrian Patent Application Nos. A 50643/2019, filed on Jul. 17, 2019, A 50013/2020, filed on Jan. 10, 2020, A 50441/2020, filed on May 20, 2020, and A 50442/2020, filed on May 20, 2020, the disclosures of which are all incorporated herein, in their entirety, by reference.

BACKGROUND a. Technical Field

The invention relates to an electromagnetic actuator, which is designed to be connected to a backside of a plate like structure opposite to a sound emanating surface of the plate like structure and which comprises an annular coil arrangement and a magnet system being designed to generate a magnetic field transverse to a longitudinal direction of a wire of the annular coil arrangement wound around an actuator axis, wherein the annular coil arrangement and the magnet system are connected to each other by a plurality of springs. Furthermore, the invention relates to an output device, comprising a plate like structure with a sound emanating surface and a backside opposite to the sound emanating surface and an electromagnetic actuator of the above kind, which is connected to the backside of the plate like structure. In particular, the plate like structure can be embodied as a display. In this way, the electrodynamic actuator together with the display forms an output device (for both audio and video data).

b. Background Art

An electromagnetic actuator and an output device of the above kind are known. When an input signal is applied to the annular coil arrangement, the magnet system (strictly speaking its movable part) is pushed in the direction of the actuator axis. Because of the inertia of the magnet system, a reaction force is caused, which pushes the coil arrangement in the contrary direction. That is why the plate like structure/display is deflected and sound according to the input signal is generated.

A drawback of known solutions is the vulnerability of the movable parts of the electromagnetic actuator, in particular of the springs. To support the efficiency of the electromagnetic actuator, said springs are quite soft and therefore fragile. Generally, the ratio between sound power and electric input power shall be as high as possible. Because of their dimensions, the springs are critical parts of the electromagnetic actuator in view of lifetime of the electromagnetic actuator and can break easily making the electromagnetic actuator and the device, which it is built into, unusable.

SUMMARY OF THE INVENTION

Thus, it is an object of the invention to overcome the drawbacks of the prior art and to provide a better electromagnetic actuator and a better output device. In particular, the lifetime of the electromagnetic actuator shall be increased at no or no substantial additional costs.

The inventive problem is solved by an electromagnetic actuator as defined in the opening paragraph, wherein the plurality of springs is arranged inside of the annular coil arrangement, in particular exclusively arranged inside of the annular coil arrangement.

Furthermore, the inventive problem is solved by an output device, comprising a plate like structure with a sound emanating surface and a backside opposite to the sound emanating surface and an electromagnetic actuator of the above kind, which is connected to the backside of the plate like structure. In particular, the plate like structure can be embodied as a display. In this way, the electrodynamic actuator together with the display forms an output device (for both audio and video data).

By the proposed measures, the springs of the electromagnetic actuator are arranged in the interior of the electromagnetic actuator and hence protected from negative influence from the outside. Accordingly, high efficiency of the electromagnetic actuator can be supported by soft and fragile springs without risking their breakage caused by bad influence from the outside. Hence, the lifetime of the electromagnetic actuator and the device, which it is built into, can be increased at no or no substantial additional costs.

Generally, a device, which the electromagnetic actuator is built into, may be any device with a plate like structure/display which additionally shall output sound. In particular, the invention relates to mobile devices like mobile phones and so on.

The term "wire" has to be interpreted widely and is not limited to circular cross sections. Instead, the term "wire" does also include flat conductive structures like metal foils, which are interconnected to form a voice coil or a coil arrangement.

Generally, the springs may comprise or consist of a metal, in particular steel, brass, bronze, molybdenum or tungsten. It is advantageous, if the springs are made of a stainless steel, and it is very advantageous if the springs are made of a cold-rolled stainless steel with a fatigue strength in a range of 370 to 670 N/mm$^2$ or an ultimate tensile strength in a range of 1100 to 2000 N/mm$^2$. Beneficially, austenitic stainless steel can be used for the springs, in particular stainless steel 1.4404. Austenitic stainless steels have a high share of austenite and as such are non-ferromagnetic or low-ferromagnetic. Accordingly no or just low (unwanted) forces are induced into the springs when they move in the magnetic field in the air gap of the magnet system. Such forces could shift the (dynamic) idle position of the electromagnetic actuator and deteriorate the characteristics of the electromagnetic actuator. Moreover, austenitic stainless steel does not or does not substantially magnetically bridge the air gap of the magnet system. In other words, the springs do not form magnetic short circuits in the magnet system. Furthermore, stainless steel, in addition to its characteristics presented before, provides the advantage that it is resistant against oxidation. In principle, the springs may also be coated with another metal or a polymer (e.g. a thermoplastics, a thermosetting plastic, an elastomer, silicone or rubber).

The "fatigue strength" (or endurance limit or fatigue limit), generally is the stress level below which an infinite number of loading cycles can be applied to a material without causing fatigue failure or inadmissible deformation. Above this stress level, fatigue failure or inadmissible deformation occurs in some point of time.

The "ultimate tensile strength" is the maximum stress that a material can withstand while being stretched or pulled before breaking (in case of a single load). The ultimate tensile strength, as a rule of thumb, is about three times the fatigue strength for metals.

Further details and advantages of the electromagnetic actuator of the disclosed kind will become apparent in the following description and the accompanying drawings.

In an advantageous embodiment, a (or each) spring arrangement comprises:
- an annular outer holder;
- a center holder inside of the annular outer holder; and
- the plurality of springs arranged between the annular outer holder and the center holder.

In other words, the springs are part of a spring arrangement, which additionally comprises the annular outer holder and the center holder, wherein one end of each spring is connected to the annular outer holder and wherein the other end of each spring is connected to the center holder. In this way, the springs can be held in position, and a proper function of the springs is ensured.

In another advantageous embodiment, a (or each) spring arrangement comprises:
- a combined holder with an annular section and an additional center section; and
- the plurality of springs, which extend from the center section and which have a connecting section at their extending ends inside of the annular section.

This is another embodiment, in which the springs are part of a spring arrangement. One end of each spring is connected to the center section of the combined holder, and the other end of each spring comprises a (separate) connecting section, for example a connecting pad. In this way, the springs can be held in position, and a proper function of the springs is ensured, too.

In yet another advantageous embodiment, the annular outer holder and the center holder or the annular section of the combined holder and the connecting sections of the springs are arranged in different planes in an idle position of a movable part of the electromagnetic actuator. In particular, the center holder or the connecting sections of the springs are arranged closer to the movable part of the magnet system than the annular outer holder or the annular section of the combined holder. For this reason, basically the complete free space between the annular outer holder and the center holder or the annular section of the combined holder and the connecting sections of the springs can be used for a movement of the movable part of the magnet system. This embodiment is particularly useful if two spring arrangements are used to hang up the movable part of the magnet system.

Furthermore, it is of advantage if the plurality of springs is preloaded in an idle position of a movable part of the electromagnetic actuator. In this way, manufacturing of the electromagnetic actuator can be made easier because the springs need not to be bent before assembling the electromagnetic actuator. Instead, they are moved out of the plane of the annular outer holder or the annular section of the combined holder, when the electromagnetic actuator is assembled and keep their preloaded state in the idle position of the movable part of the finalized electromagnetic actuator.

Beneficially, the springs are symmetrically shaped only around the actuator axis in case of circular coil arrangement. By these measures, a comparably large spring length in a relatively small radial room can be obtained.

Beneficially, the springs are symmetrically shaped around an axis perpendicular to the actuator axis in case of a non-circular coil arrangement. By these measures, a rotation between the annular coil arrangement and the magnet system is hindered so that they do not collide when the electromagnetic actuator is excursed.

Beneficially, the springs are spirally and/or arc shaped. In this way, the springs may be very long and therefore soft in a relatively small radial room. Hence, an excursion of the electromagnetic actuator is not hindered much.

Beneficially, the springs are shaped like a meander. In this way, the springs may be very long and therefore soft what does not substantially hinder an excursion of the electromagnetic actuator, too.

Beneficially, the spring arrangement is one piece. Accordingly, assembly of the electromagnetic actuator is simplified.

Beneficially, the annular coil arrangement is fixedly arranged relative to the plate like structure and at least a movable part of the magnet system is movably arranged relative to the plate like structure. In this way, a comparably high excursion or deflection of the plate like structure is obtained because the magnet system is comparably heavy and allows for high reactive forces. Although this embodiment is advantageous, the annular coil arrangement can also movably be arranged relative to the plate like structure and the magnet system can fixedly arranged relative to the plate like structure. Generally, the magnet system may be movable as a whole or may be movable in parts.

Beneficially, the annular outer holder of the spring arrangement is fixedly arranged relative to the plate like structure and its center holder is fixedly arranged relative to the movable part of the magnet system. In another beneficial embodiment, the annular section of the combined holder is fixedly arranged relative to the plate like structure and the connecting sections of the springs are fixedly arranged relative to the movable part of the magnet system. In particular the annular outer holder of the spring arrangement or the annular section of the combined holder of the spring arrangement can directly be connected to the plate like structure, for example by means of an adhesive sheet or a glue layer. By the proposed measures, a connecting area to the plate like structure is comparably large.

Beneficially, also the center holder of the spring arrangement can fixedly be arranged relative to the plate like structure and the annular outer holder is fixedly arranged relative to the movable part of the magnet system. In another beneficial embodiment, the connecting sections of the springs are fixedly arranged relative to the plate like structure and the annular section of the combined holder is fixedly arranged relative to the movable part of the magnet system. In particular the annular outer holder of the spring arrangement or the annular section of the combined holder of the spring arrangement can directly be connected to the movable part of the magnet system, for example by means of an adhesive sheet or a glue layer. By the proposed measures, a connecting area to the movable part of the magnet system is comparably large.

Beneficially, a movable part of the magnet system comprises:
- a top plate from soft iron;
- a bottom plate from soft iron; and
- a center magnet mounted to the top plate and to the bottom plate.

In this way, proved and commonly available means are used for the magnet system.

In case that the coil arrangement comprises just a single voice coil, the top plate beneficially is disc shaped and the bottom plate is pot shaped, wherein the annular part of the pot shaped bottom plate is arranged outside of the annular coil arrangement. Accordingly, the above magnet system can be used in combination with a single coil.

In an advantageous embodiment of the electromagnetic actuator, a center holder of a first spring arrangement is mounted to the top plate and a center holder of a second spring arrangement is mounted to the bottom plate, or the connecting sections of the springs of a first spring arrangement are mounted to the top plate and the connecting sections of the springs of a second spring arrangement are mounted to the bottom plate. By these measures, a rocking movement of the movable part of the magnet system is avoided or at least kept low because the mounting points of the movable parts of the magnet system are located at an axial distance.

It is also of advantage, if the coil arrangement comprises a first voice coil and a second voice coil arranged above another and the magnetic field passes the first voice coil from the inner side of the annular coil arrangement to the outer side of the annular coil arrangement, and the magnetic field passes the second voice coil from the outer side of the annular coil arrangement to the inner side of the annular coil arrangement. Hence, a magnetic flux generated by the magnet system is guided in an advantageous way. The first voice coil and the second voice coil may be arranged at a distance from one another or may be stacked, i.e. connected to one another by means of an adhesive for example.

In case that the coil arrangement comprises a first voice coil and a second voice coil arranged above another it is particularly advantageous if both the top plate and the bottom plate are disc shaped, wherein the top plate is arranged vis-a-vis of the first voice coil and the bottom plate from is arranged vis-a-vis of the second voice coil, and a fixed part of the magnet system comprises an outer ring from soft iron arranged around the annular coil arrangement vis-a-vis of both the first voice coil and the second voice coil. Hence, commonly available means can be used for the magnet system in the context of a coil arrangement with a first voice coil and a second voice coil. Again, the first voice coil and the second voice coil may be arranged at a distance from one another or may be stacked, i.e. connected to one another by means of an adhesive for example.

It is also of advantage, if a center connector is fixedly arranged relative to the plate like structure, a center holder of the spring arrangement is mounted to the center connector and the top plate or the bottom plate of the movable part of the magnet system is mounted to an annular outer holder of the spring arrangement. By these measures, the spring arrangement can extend over the coil arrangement, and a comparably large connecting area of the annular outer holder is provided.

In yet another advantageous embodiment of the electromagnetic actuator, center connector is fixedly arranged relative to the plate like structure, a center holder of a first spring arrangement is mounted to the center connector, a center holder of a second spring arrangement is mounted to the center connector at a distance from the center holder of the first spring arrangement, and the movable part of the magnet system is arranged between an annular outer holder of the first spring arrangement and an annular outer holder of the second spring arrangement, wherein the top plate is mounted to the annular outer holder of the first spring arrangement and the bottom plate is mounted to the annular outer holder of the second spring arrangement. By these measures, a rocking movement of the movable part of the magnet system is avoided or at least kept low because the mounting points of the movable parts of the magnet system are located at an axial distance.

Beneficially, the fixed part of the magnet system is mounted to the center connector (in particular outside of the first spring arrangement and the second spring arrangement). In this way, the center connector provides multiple ways of use.

It is also of advantage, if a center connector is movably arranged relative to the plate like structure, a center holder of the spring arrangement is mounted to the center connector and the top plate and the bottom plate and the center magnet of the movable part of the magnet system are mounted to the center connector. By these measures, the center connector forms a common mounting part for the movable part of the magnet system.

In yet another advantageous embodiment of the electromagnetic actuator, a center connector is movably arranged relative to the plate like structure, a center holder of a first spring arrangement is mounted to the center connector, a center holder of a second spring arrangement is mounted to the center connector at a distance from the center holder of the first spring arrangement, and the top plate and the bottom plate and the center magnet of the movable part of the magnet system are mounted to the center connector. By these measures, again a rocking movement of the center holder, which the movable part of the magnet system is connected to, is avoided or at least kept low because the mounting points of the center holder of the magnet system are located at an axial distance.

Beneficially, the fixed part of the magnet system is mounted to the annular outer holder. In this way, the annular outer holder provides multiple ways of use.

In a very advantageous embodiment, the first spring arrangement and the second spring arrangement are of identical shape, but turned by 90° to one another around the actuator axis. In this way, a tilting movement of the movable part of the magnet system can be avoided or at least can be kept low.

In a very advantageous embodiment of the electromagnetic actuator, an air gap between the movable part of the magnet system and the center connector or between the movable part of the magnet system and the fixed part of the magnet system is smaller than an air gap between the movable part of the magnet system and the annular coil arrangement, each measured in a direction perpendicular to the actuator axis. In particular the smallest air gap between the movable part of the magnet system and the center connector or between the movable part of the magnet system and the fixed part of the magnet system is smaller than the smallest air gap between the movable part of the magnet system and the annular coil arrangement, each measured in a direction perpendicular to the actuator axis. By the above measures, a lateral acceleration of the electromagnetic actuator (i.e. transverse to a direction of the actuator axis) cannot cause a collision of the comparably heavy magnet system with the comparably fragile coil arrangement and in turn cannot cause damage of the coil arrangement. Instead, the magnet system can just collide with the comparable stable center connector or with the comparable stable fixed part of the magnet system. Such a lateral acceleration, for example, may be caused when a device with an electromagnetic actuator (e.g. a mobile phone) falls down and hits the floor.

In yet another very advantageous embodiment of the electromagnetic actuator, a fixed part of the magnet system comprises an outer ring from soft iron arranged around the annular coil arrangement, and the coil arrangement touches said outer ring or is connected thereto. This is another possibility to avoid damage of the coil arrangement in case of a lateral acceleration of the electromagnetic actuator (i.e. transverse to a direction of the actuator axis). However, a collision of the comparably heavy magnet system with the comparably fragile coil arrangement is not necessarily avoided, but it does not cause a substantial damage of the coil, which is supported by the comparable stable outer ring of the magnet system in lateral direction. Again, such a lateral acceleration, for example, may be caused when a device with an electromagnetic actuator (e.g. a mobile phone) falls down and hits the floor. It is sufficient if the coil arrangement touches said outer ring for the aforementioned supporting function or if just a small (and unavoidable) gap is located between the coil arrangement the outer ring. However, to avoid any air gap between the coil arrangement and the outer ring, the coil arrangement can be connected to the outer ring, e.g. by means of an adhesive. Another advantage of this embodiment is that the magnetic gap between the coil arrangement and the outer ring is zero or almost zero. Thus, in total there is just a single magnetic gap between a coil and the magnet system. In that, the electromagnetic actuator is very efficient. Another advantage of connecting the coil arrangement to said outer ring is the improved heat dissipation and temperature averaging. Heat generated within the coil arrangement caused by the current flowing through the same can flow into the outer ring thus improving heat dissipation because of the enlarged (outer) surface on the one hand and also averaging the temperature within the coil arrangement because of the higher thermal mass on the other hand.

Beneficially, an average sound pressure level of the output device measured in an orthogonal distance of 10 cm from the sound emanating surface is at least 50 dB_SPL in a frequency range from 100 Hz to 15 kHz. "Average sound pressure level $SPL_{AVG}$" in general means the integral of the sound pressure level SPL over a particular frequency range divided by said frequency range. In the above context, in detail the ratio between the sound pressure level SPL integrated over a frequency range from f=100 Hz to f=15 kHz and the frequency range from f=100 Hz to f=15 kHz is meant. In particular, the above average sound pressure level is measured at 1 W electrical power more particularly at the nominal impedance. The unit "dB_SPL" generally denotes the sound pressure level relative to the threshold of audibility, which is 20 µPa.

It should be noted that the use of a coil arrangement with a first voice coil and a second voice coil may also be useful without the features of claim 1, in particular without arranging the springs inside of the annular coil arrangement, and such an electromagnetic actuator may form the basis for a divisional application. An independent claim for such an electromagnetic actuator can look like below.

Electromagnetic actuator, which is designed to be connected to a backside of a plate like structure and which comprises an annular coil arrangement and a magnet system being designed to generate a magnetic field transverse to a longitudinal direction of a wire of the annular coil arrangement wound around an actuator axis, wherein the coil arrangement comprises a first voice coil and a second voice coil arranged above another and the magnetic field passes the first voice coil from the inner side of the annular coil arrangement to the outer side of the annular coil arrangement, and the magnetic field passes the second voice coil from the outer side of the annular coil arrangement to the inner side of the annular coil arrangement.

The first voice coil and the second voice coil may be arranged at an axial distance from one another or may be stacked, i.e. connected to one another by means of an adhesive for example. This provides more design freedom in terms of the height of the magnet system in relation to the height of the voice coils.

Of course, the annular coil arrangement and the magnet system can be connected to each other by a plurality of springs. Further on, the features of the dependent claims may apply to the above electromagnetic actuator if the plurality of springs is arranged inside of the annular coil arrangement (in particular exclusively arranged inside of the annular coil arrangement).

BRIEF DESCRIPTION OF THE DRAWINGS

These and other aspects, features, details, utilities, and advantages of the invention will become more fully apparent from the following detailed description, appended claims, and accompanying drawings, wherein the drawings illustrate features in accordance with exemplary embodiments of the invention, and wherein:

Like reference numbers refer to like or equivalent parts in the several views.

DETAILED DESCRIPTION OF EMBODIMENTS

Figure 1:
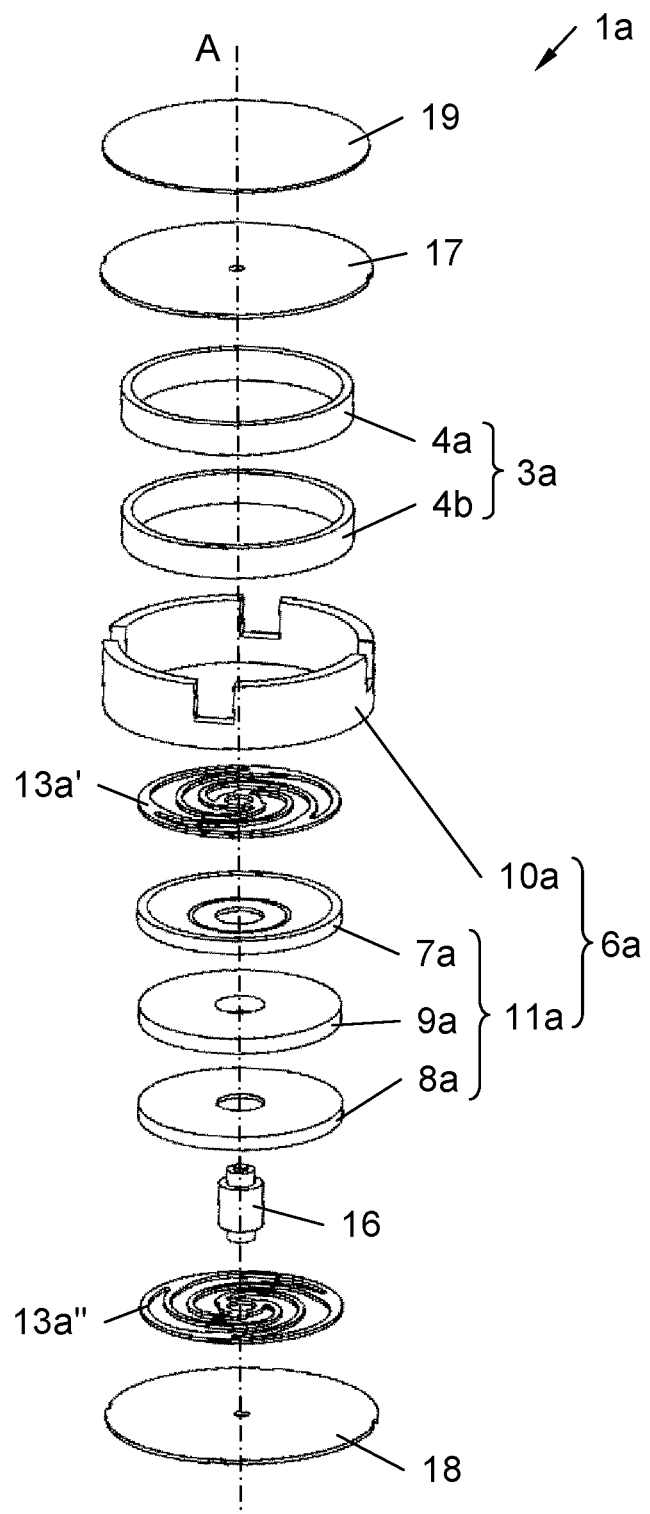
FIG. 1 shows a first embodiment of an electromagnetic actuator with two spring arrangements and the movable part of the magnet system in-between in exploded view.

Various embodiments are described herein to various apparatuses. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It must be noted that, as used in this specification and the appended claims, the singular forms "a," "an" and "the" include plural referents unless the content clearly dictates otherwise.

The terms "first," "second," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

All directional references (e.g., "plus," "minus," "upper," "lower," "upward," "downward," "left," "right," "leftward," "rightward," "front," "rear," "top," "bottom," "over," "under," "above," "below," "vertical," "horizontal," "clockwise," and "counterclockwise") are only used for identification purposes to aid the reader's understanding of the present disclosure, and do not create limitations, particularly as to the position, orientation, or use of the any aspect of the disclosure. It is to be understood that the terms so used are interchangeable under appropriate circumstances such that the embodiments of the invention described herein are, for example, capable of operation in other orientations than those illustrated or otherwise described herein.

As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose.

Joinder references (e.g., "attached," "coupled," "connected," and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

All numbers expressing measurements and so forth used in the specification and claims are to be understood as being modified in all instances by the term "about" or "substantially," which particularly means a deviation of 10% from a reference value.

Figure 2:
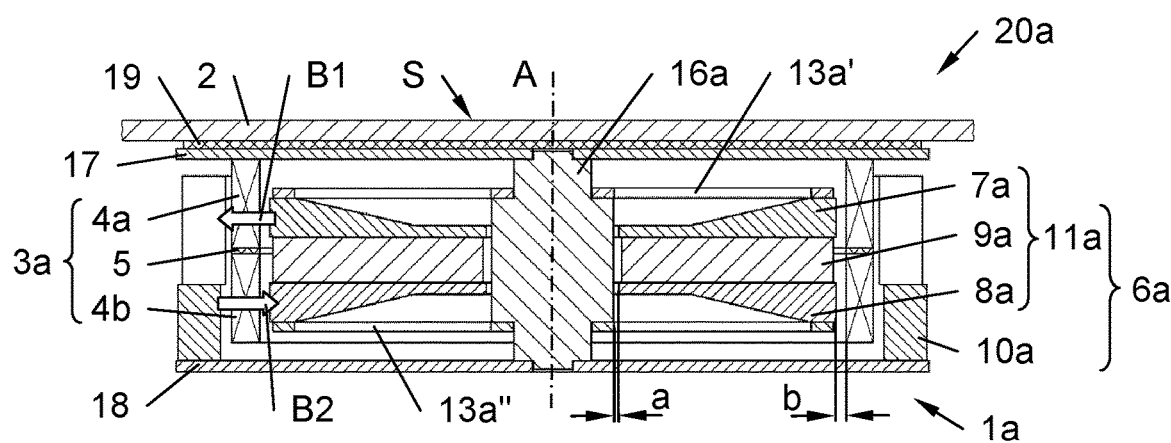
FIG. 2 shows the electromagnetic actuator of FIG. 1 in sectional view.
Figure 7:
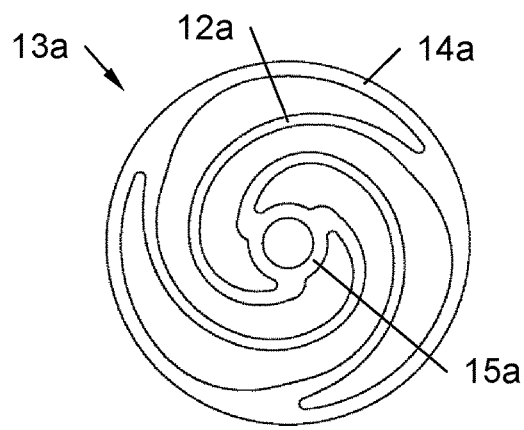
FIG. 7 shows a top view of the spring arrangement with spiral springs, which is used in the embodiment of FIG. 1.

A first example of an electromagnetic actuator 1a is disclosed by use of the FIGS. 1, 2 and 7. FIG. 1 shows an exploded view of the electromagnetic actuator 1a, FIG. 2 shows a cross sectional view of the electromagnetic actuator 1a and FIG. 7 shows a top view of a spring arrangement used in the electromagnetic actuator 1a.

The electromagnetic actuator 1a is designed to be connected to a backside of a plate like structure, which is assumed to be embodied as display 2 in this example (see FIG. 2). Nevertheless, in principle, the plate like structure may be any plate like structure, which is able to output sound when it is excited. The electromagnetic actuator 1a has an annular coil arrangement 3a, which in this example comprises a first voice coil 4a and a second voice coil 4b stacked above another and connected to each other by means of a glue layer 5 for example.

The electromagnetic actuator 1a furthermore has a magnet system 6a, which in this example comprises a top plate 7a from soft iron, a bottom plate 8a from soft iron, a center magnet 9a, which is mounted to the top plate 7a and to the bottom plate 8a, and an outer ring 10a from soft iron. The top plate 7a, the bottom plate 8a and the center magnet 9a are comprised of the movable part 11a of the magnet system 6a or these parts may even form the movable part 11a of the magnet system 6a. The outer ring 10a is comprised of the fixed part of the magnet system 6a or it may even form the fixed part of the magnet system 6a. Accordingly, the fixed part of the magnet system 6a may be denoted with the reference sign of the outer ring 10a as the case may be. Both the top plate 7a and the bottom plate 8a are disc shaped, wherein the top plate 7a is arranged vis-a-vis of the first voice coil 4a and the bottom plate 8a is arranged vis-a-vis of the second voice coil 4b. The fixed part of the magnet system 6a, which is the outer ring 10a in this example, is arranged around the annular coil arrangement 3a vis-a-vis of both the first voice coil 4a and the second voice coil 4b.

The magnet system 6a generally is designed to generate a magnetic field B1, B2 transverse to a longitudinal direction of a wire of the annular coil arrangement 3a wound around an actuator axis A. In detail, the magnetic field B1 passes the first voice coil 4a from the inner side of the annular coil arrangement 3a to the outer side of the annular coil arrangement 3a, and the magnetic field B2 passes the second voice coil 4b from the outer side of the annular coil arrangement 3a to the inner side of the annular coil arrangement 3a.

The annular coil arrangement 3a and the movable part 11a of the magnet system 6a are connected to each other by a plurality of springs 12a, which are arranged inside of the annular coil arrangement 3a. In detail, the springs 12a are part of a spring arrangement 13a, 13a', 13a", which additionally comprises an annular outer holder 14a and a center holder 15a inside of the annular outer holder 14a. The plurality of springs 12a is arranged between the annular outer holder 14a and the center holder 15a and fixed thereto (one end of each spring 12a is connected to the annular outer holder 14a, and the other end of each spring 12a is connected to the center holder 15). In particular, the spring arrangement 13a, 13a', 13a'' is one piece like this is the case in the example of FIG. 7. By the aforementioned measures, the springs 12a can be held in position, and assembly of the electromagnetic actuator 1a is simplified.

The electromagnetic actuator 1a of this example furthermore comprises a center connector 16a fixedly arranged relative to the display 2. In more detail, a center holder 15a of a first spring arrangement 13a' is mounted to the center connector 16a, and a center holder 15a of a second spring arrangement 13a'' is mounted to the center connector 16a at a distance from the center holder 15a of the first spring arrangement 13a'.

The movable part 11a of the magnet system 6a is arranged between an annular outer holder 14a of the first spring arrangement 13a' and an annular outer holder 14a of the second spring arrangement 13a'', wherein the top plate 7a is mounted to the annular outer holder 14a of the first spring arrangement 13a', and the bottom plate 8a is mounted to the annular outer holder 14a of the second spring arrangement 13a''. Moreover, the fixed part 10a of the magnet system 6a is mounted to the center connector 16a, in particular outside of the first spring arrangement 13a' and the second spring arrangement 13a''. By these measures, a rocking movement of the movable part 11a of the magnet system 6a is avoided or at least kept low because the mounting points of the movable parts 11a of the magnet system 6a are located at an axial distance.

Finally, the electromagnetic actuator 1a comprises a top mounting plate 17 on the upper end of the center connector 16a and a bottom mounting plate 18 on the lower end of the center connector 16a. The top mounting plate 17 connects the center connector 16a and the annular coil arrangement 3a, and the bottom mounting plate 18 connects the center connector 16a and the outer ring 10a of the magnet system 6a. Moreover, an adhesive sheet 19 is arranged on the upper side of the top mounting plate 17, by means of which the electromagnetic actuator 1a is mounted to the backside of the display 2. However, a glue layer may be used for this reason as well. Beneficially, the connecting area between the display 2 and the annular outer holder 14a is comparably large in this embodiment.

Advantageously, an air gap a between the movable part 11a of the magnet system 6a and the center connector 16a is smaller than an air gap b between the movable part 11a of the magnet system 6a and the annular coil arrangement 3a in this example, wherein the gaps a and b are each measured in a direction perpendicular to the actuator axis A. In particular the smallest gap a and the smallest gap b is taken for the above considerations. By the proposed measures, a lateral acceleration of the electromagnetic actuator 1a transverse to a direction of the actuator axis A cannot cause a collision of the movable part 11a of the magnet system 6a with the coil arrangement 3a and in turn cannot cause damage of the coil arrangement 3a. Instead, the movable part 11a of the magnet system 6a can just collide with the center connector 16a. Generally, a lateral acceleration of the aforementioned kind may be caused, when a device with the electromagnetic actuator 1a (e.g. a mobile phone) falls down and hits the floor.

The electromagnetic actuator 1a together with the display 2 forms an output device 20a for both audio and video data.

When an input signal is applied to the voice coils 4a, 4b of the coil arrangement 3a, the movable part 11a of the magnet system 6a is pushed in the direction of the actuator axis A, that means up or down. Because of the inertia of said movable part 11a, a reaction force is caused, which pushes the coil arrangement 3a in the contrary direction. That is why the display 2 is deflected and sound according to the input signal is generated. It should be noted, that the current flows through the voice coils 4a, 4b in opposite directions so that the electromagnetic forces generated by the voice coils 4a, 4b are summed. The voice coils 4a, 4b are beneficially wired in parallel or in series so that the inductance is reduced by the opposite direction of the induced magnetic fields of both voice coils 4a, 4b.

Figure 3:
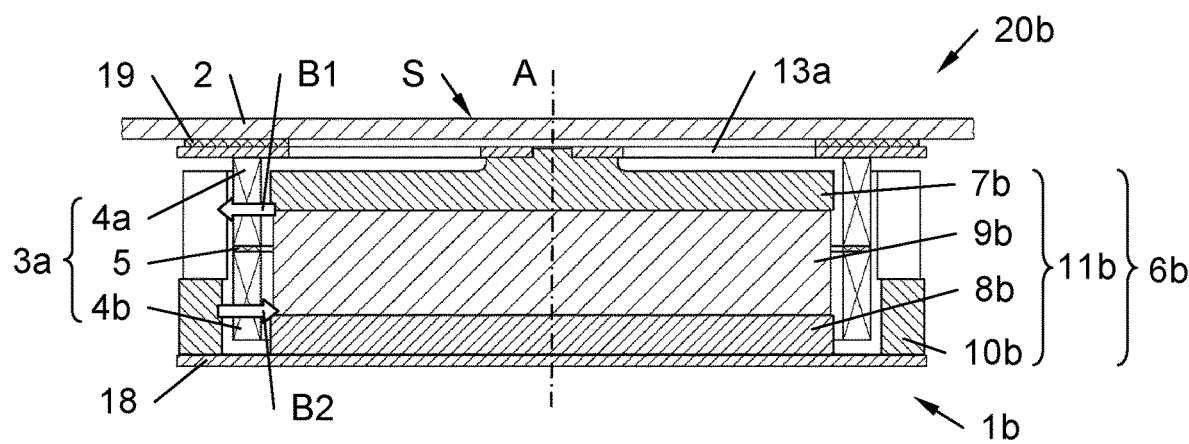
FIG. 3 shows a second embodiment of an electromagnetic actuator with a single spring arrangement in sectional view.

In the example shown in FIGS. 1 and 2, the center holder 15a of the spring arrangement 13a', 13a'' is fixedly arranged relative to the display 2, and the annular outer holder 14a of the spring arrangement 13a', 13a'' is fixedly arranged relative to the movable part 11a of the magnet system 6a. Although this is advantageous, this is not the only possibility. It is also imaginable that the annular outer holder 14a of the spring arrangement 13a is fixedly arranged relative to the display 2 and the center holder 15a of the spring arrangement 13a is fixedly arranged relative to the movable part 11b of the magnet system 6b like this is the case for the electromagnetic actuator 1b shown in FIG. 3. By these measures, the spring arrangement 13a can extend beyond the coil arrangement 3a and a comparably large connecting area between the annular outer holder 14b and the display 2 is provided.

The electromagnetic actuator 1b is similar to the electromagnetic actuator 1a, but it is built without a center connector 16a. Instead, the magnet system 6b, which is movable as a whole in this case and which comprises a top plate 7b, a bottom plate 8b and a center magnet 9b, is directly connected to the spring arrangement 13a. In detail, the annular outer holder 14a is connected to the display 2 by means of the adhesive sheet 19 or the glue layer, and the center holder 15a is connected to the top plate 7b. The electromagnetic actuator 1b together with the display 2 forms an output device 20b for both audio and video data.

Figure 4:
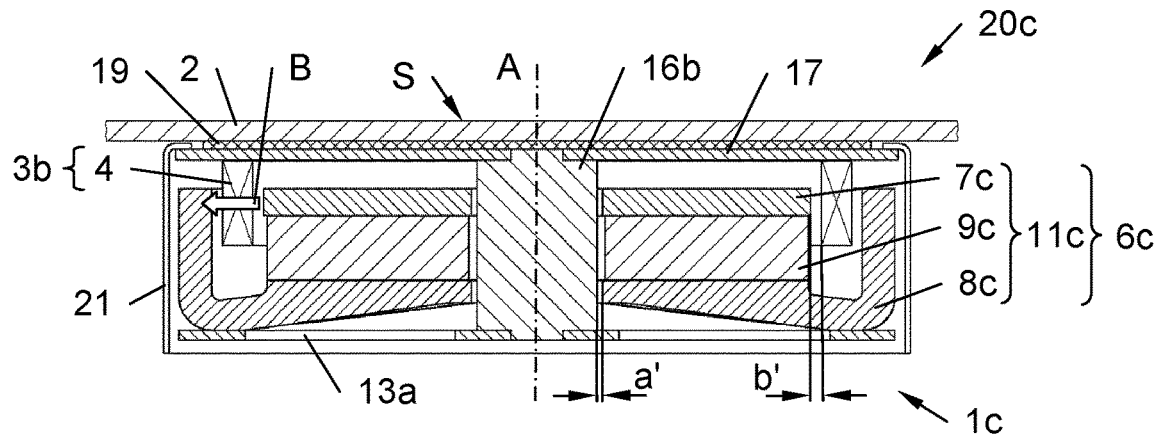
FIG. 4 shows a third embodiment of an electromagnetic actuator with a single coil in sectional view.

FIG. 4 shows a further example of an electromagnetic actuator 1c, which has a coil arrangement 3b with a single coil 4. The movable part 11c of the magnet system 6c again comprises a top plate 7c from soft iron, a bottom plate 8c from soft iron and a center magnet 9c mounted to the top plate 7c and to the bottom plate 8c. The top plate 7c is disc shaped and the bottom plate 8c is pot shaped, wherein the annular part of the pot shaped bottom plate 8c is arranged outside of the annular coil arrangement 3b. Again, a center connector 16b is fixedly arranged relative to the display 2. A center holder 15a of a spring arrangement 13a is mounted to the center connector 16b and the bottom plate 8c of the movable part 11c of the magnet system 6c is mounted to an annular outer holder 14a of the spring arrangement 13a. Beneficially, the connecting area between the bottom plate 8c and the annular outer holder 14a is comparably large in this embodiment because the annular outer holder 14a extends beyond the coil arrangement 3b.

Finally, the electromagnetic actuator 1c comprises a ring cover 21 protecting the inner parts of the electromagnetic actuator 1c. Again, an air gap a' between the movable part 11c of the magnet system 6c and the center connector 16b is smaller than an air gap b' between the movable part 11c of the magnet system 6c and the annular coil arrangement 3b, wherein the gaps a' and b' are each measured in a direction perpendicular to the actuator axis A. The advantages disclosed in the context of the electromagnetic actuator 1a apply equally.

The electromagnetic actuator 1c together with the display 2 forms an output device 20c for both audio and video data again.

Although it is advantageous if the annular coil arrangement 3a, 3b is fixedly arranged relative to the display 2 and the magnet system 6a . . . 6c partly or as a whole is movably arranged relative to the display 2, it is also imaginable that the magnet system 6a . . . 6c is fixedly arranged relative to the display 2 and the coil arrangement 3a, 3b is movably arranged relative to the display 2.

Figure 5:
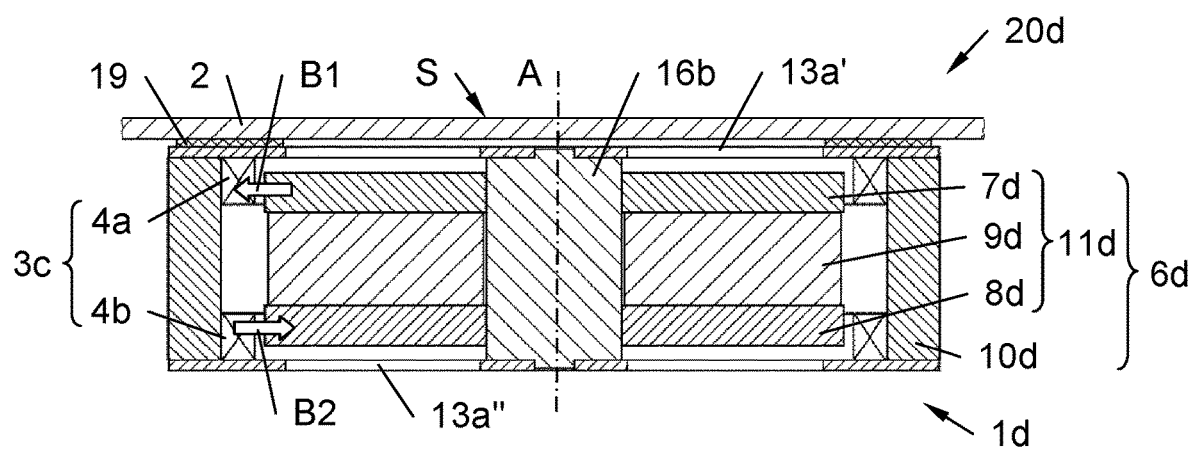
FIG. 5 shows a fourth embodiment of an electromagnetic actuator with a movable center connector in sectional view.

FIG. 5 shows another example of an electromagnetic actuator 1d, which is similar to the electromagnetic actuator 1a of FIG. 2. In contrast, the top plate 7d, the bottom plate 8d and the center magnet 9d, which form the movable part 11d of the magnet system 6d, are connected to the center connector 16b. In detail, a center holder 15a of a first spring arrangement 13a' is mounted to the center connector 16b at a first position, and a center holder 15a of a second spring arrangement 13a'' is mounted to the center connector 16b at a second position at a distance from the center holder 15a of the first spring arrangement 13a'. Thus, the center connector 16b is movably arranged relative to the display 2. The electromagnetic actuator 1d together with the display 2 forms an output device 20d for both audio and video data again.

In this example, the fixed part of the magnet system 6d, which is the outer ring 10d here, is connected to the annular outer holders 14a of the first spring arrangement 13a' and the second spring arrangement 13a''.

Although the use of a first spring arrangement 13a' and a second spring arrangement 13a'' is beneficial, the center connector 16b can be connected only to a single spring arrangement 13a', 13a'', too. In this case, either the first spring arrangement 13a' or the second spring arrangement 13a'' may be used to hang up the center connector 16b. The same counts for the annular outer holders 14a. In case that just a single spring arrangement 13a', 13a'' is used, the outer ring 10d is either connected to the first spring arrangement 13a' or to the second spring arrangement 13a''.

In the embodiment of FIG. 5, the coil arrangement 3c touches the outer ring 10d or is connected thereto. In this way, a collision of the movable part 11d of the magnet system 6d does not cause a substantial damage of the coil arrangement 3c, which is supported by the outer ring 10d in lateral direction. In principle, it is sufficient if the coil arrangement 3c touches the outer ring 10d for the aforementioned supporting function. Also, a small (and unavoidable) gap between the coil arrangement 3c and the outer ring 10d does not substantially deteriorate said supporting function. However, to avoid any air gap between the coil arrangement 3c and the outer ring 10d, the coil arrangement 3c can be connected to the outer ring 10d, e.g. by means of an adhesive. Another advantage of this embodiment is that the magnetic gap between the coil arrangement 3c and the outer ring 10d is zero or almost zero. Thus, in total there is just a single magnetic gap between a coil 4a, 4b and the magnet system 6d. In that, the electromagnetic actuator 1d is very efficient. Another advantage of connecting the coil arrangement 3c to said outer ring 10d is the improved heat dissipation and temperature averaging. Heat generated within the coil arrangement 3c caused by the current flowing through the same can flow into the outer ring 10d thus improving heat dissipation because of the enlarged (outer) surface on the one hand and also averaging the temperature within the coil arrangement 3c because of the higher thermal mass on the other hand. The embodiment of FIG. 5 moreover benefits from the voice coils 4a, 4b being spaced from one another because the enlarged surface of the coil arrangement 3c in comparison to connected voice coils 4a, 4b improves heat dissipation as well.

One should also note that the voice coils 4a and 4b of the coil arrangement 3c are located at an axial distance from one another what provides more design freedom in terms of the height of the top plate 7d, the bottom plate 8d and the center magnet 9d in relation to the height of the voice coils 4a and 4b. Nevertheless, also stacked (interconnected) voice coils 4a and 4b can be used in the electromagnetic actuator 1d shown in FIG. 5.

Figure 6:
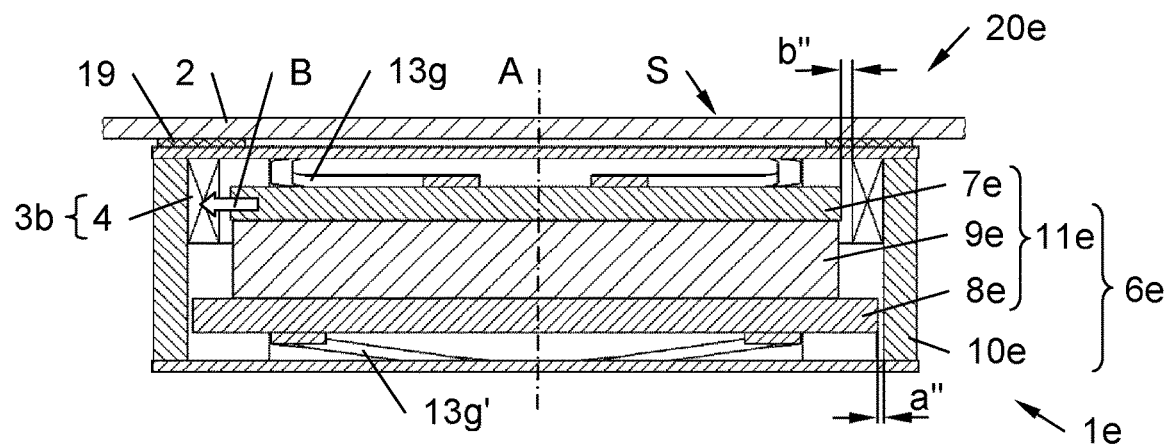
FIG. 6 shows an embodiment of an electromagnetic actuator with a different spring arrangement in sectional view.

FIG. 6 shows another embodiment of an electromagnetic actuator 1e, which is similar to the electromagnetic actuator 1d of FIG. 5. In contrast, no center connector 16b is used. Instead, the connecting sections 26 of the springs 12g of a first spring arrangement 13g are mounted to the top plate 7e, and the connecting sections 26 of the springs 12g of a second spring arrangement 13g' are mounted to the bottom plate 8e. Again, the top plate 7e, the bottom plate 8e and the center magnet 9e form the movable part 11e of the magnet system 6e, and the outer ring 10e forms the fixed part of the magnet system 6e. The electromagnetic actuator 1e together with the display 2 forms an output device 20e for both audio and video data again.

Like the electromagnetic actuator 1c of FIG. 4, the coil arrangement 3b of the electromagnetic actuator 1e comprises just a single voice coil 4, which touches the outer ring 10e or is connected thereto for the same reasons presented in context with the electromagnetic actuator 1d of FIG. 5. For improved safety, an air gap a" between the movable part 11e of the magnet system 6e and the fixed part of the magnet system 6e, which is the outer ring 10e here, is smaller than an air gap b" between the movable part 11e of the magnet system 6e and the annular coil arrangement 3b, each measured in a direction perpendicular to the actuator axis A. So, the movable part 11e of the magnet system 6e usually cannot collide with the coil arrangement 3b. But even if it does, the coil arrangement 3b is supported by the outer ring 10e.

The use of both measures is beneficial. However, it is also possible only to use either the supporting function of the outer ring 10e or the aforementioned condition for the gaps a" and b".

Moving now to the example of FIG. 7, the springs 12a are symmetrically shaped around the actuator axis A, and the springs 12a are spirally and arc shaped there. In particular, the springs 12a in the example of FIG. 7 are symmetrically shaped only around the actuator axis A (and not about an axis, which is perpendicular to the actuator axis A). By these measures, a comparably large spring length in a relatively small radial room can be obtained.

Figure 8:
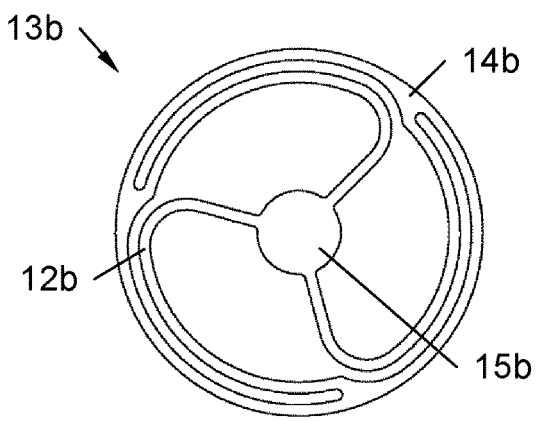
FIG. 8 shows a top view of another spring arrangement with spiral springs.

FIG. 8 shows another spring arrangement 13b with springs 12b, which are arranged between an annular outer holder 14b and a center holder 15b. The springs 12b are symmetrically shaped only around the actuator axis A and are spirally shaped, too.

Figure 9:
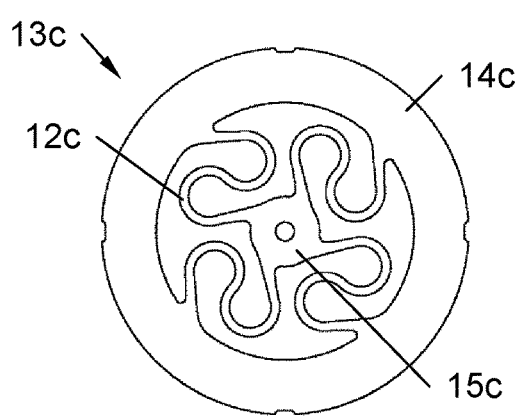
FIG. 9 shows a top view of a spring arrangement with springs shaped like meanders.

FIG. 9 shows an alternative embodiment of a spring arrangement 13c with springs 12c, which are arranged between an annular outer holder 14c and a center holder 15c. The springs 12c are symmetrically shaped only around the actuator axis A, too, but are shaped like a meander and thus can be made very long and very soft within a small radial room, too.

Figure 10:
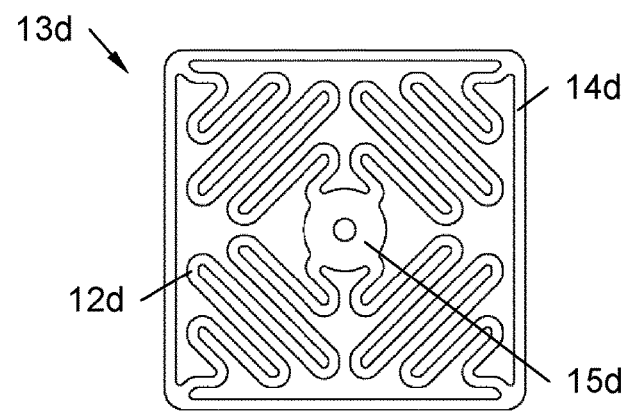
FIG. 10 shows a top view of a spring arrangement with springs shaped like meanders which are symmetrical about an axis perpendicular to the actuator axis.
Figure 11:
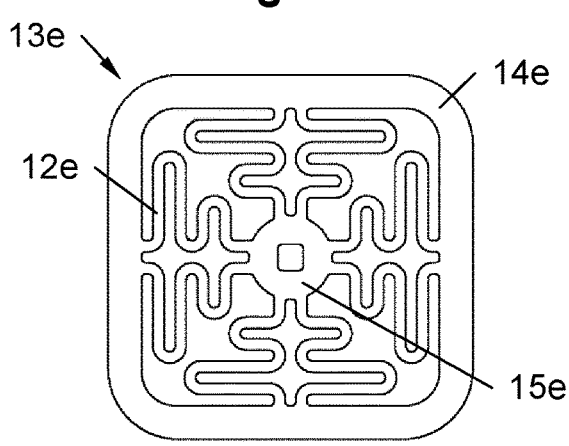
FIG. 11 shows a top view of another spring arrangement with springs shaped like meanders which are symmetrical about an axis perpendicular to the actuator axis.

FIGS. 10 to 11 show spring arrangements 13d . . . 13f with springs 12d . . . 12f, which are shaped like a meander, but which are symmetrically shaped around an axis perpendicular to the actuator axis A. In detail, the springs 12d . . . 12f are symmetrical around a vertical axis and around a horizontal axis crossing the actuator axis A. By these measures, a rotation between the annular coil arrangement 3a . . . 3c and the magnet system 6a . . . 6e is hindered so that they do not collide when the electromagnetic actuator 1a . . . 1e is excursed.

Figure 12:
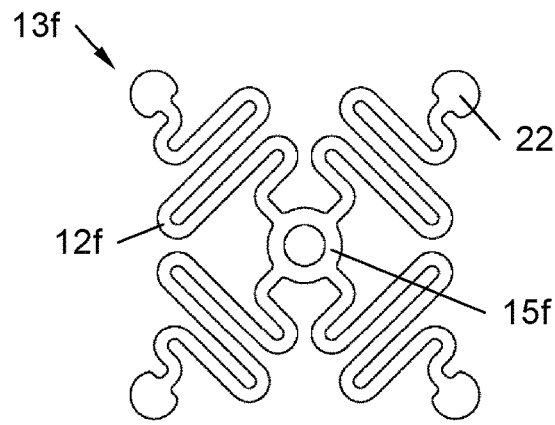
FIG. 12 shows a top view of a spring arrangement with distinct outer holders.

FIGS. 10 and 11 show embodiments with center holders 15d, 15e and annular outer holders 14d, 14e, whereas FIG. 12 shows an embodiment with a center holder 15f and distinct outer holders 22 at the end of the springs 12f.

Figure 13:
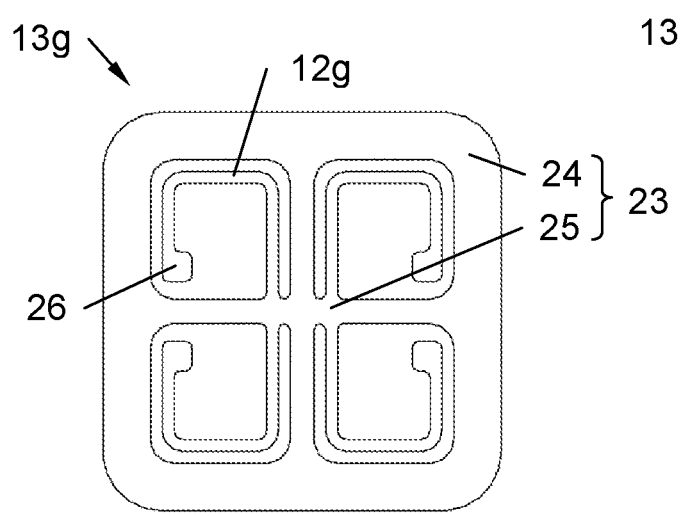
FIG. 13 shows a top view of a spring arrangement with a combined holder with an annular section and an additional center section and FIG. 14 shows the spring arrangement of FIG. 13 turned by 90°.
Figure 14:
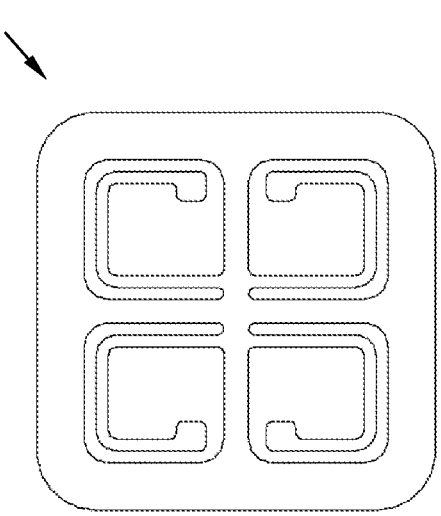

FIGS. 13 and 14 show embodiments of spring arrangements 13g and 13g', which are a bit different to those used for the other examples. In detail, the spring arrangements 13g and 13g' each comprise a combined holder 23 with an annular section 24 and an additional center section 25 and the plurality of springs 12g, which extend from the center section 25 and have a connecting section 26 at their extending ends inside of the annular section 24.

In more detail, the annular section 24 of the combined holder 23 and the connecting sections 26 of the springs 12g are arranged in different planes in an idle position of a movable part 11e of the magnet system 6e (see FIG. 6). In particular, the connecting sections 26 of the springs 12g are connected to the movable part 11e of the magnet system 6e, whereas the annular section 24 of the combined holder 23 is located more outwards. For this reason, basically the complete free space between the annular section 24 of the combined holder 23 and the connecting sections 26 of the springs 12g can be used for a movement of the movable part 11e of the magnet system 6e.

The plurality of springs 12g can also be preloaded in an idle position of a movable part of the electromagnetic actuator 1e. In this way, manufacturing of the electromagnetic actuator 1e can be made easier because the springs 12g need not to be bent before assembly of the electromagnetic actuator 1e. Instead, they are moved out of the plane of the annular section 24 of the combined holder 23, when the electromagnetic actuator 1e is assembled and they keep their preloaded state in the idle position of the movable part of the finalized electromagnetic actuator 1e.

In this example, the first spring arrangement 13g and the second spring arrangement 13g' are of identical shape, but turned by 90° to one another around the actuator axis A. In this way, a tilting movement of the movable part 11e of the magnet system 6e can be avoided or at least can be kept low. However, also different designs may be used for the first spring arrangement 13g and the second spring arrangement 13g', or identical designs at the same orientation may be used for the first spring arrangement 13g and the second spring arrangement 13g'.

It should be noted that the above measures are not limited to the embodiment of FIGS. 13 and 14, but may also be applied to the spring arrangements 13a . . . 13f shown in FIGS. 7 to 12. Accordingly, the annular outer holders 14a . . . 14e and the center holders 15a . . . 15f can be arranged in different planes in an idle position of a movable part of the electromagnetic actuator 1a . . . 1d. Moreover, the plurality of springs 12a . . . 12e can be preloaded in an idle position of a movable part of the electromagnetic actuator 1a . . . 1d. In addition, the spring arrangements 13g, 13g' can be used for the embodiments shown in FIGS. 1 to 5, and the spring arrangements 13a . . . 13f can be used for the embodiment shown in FIG. 6.

Furthermore, it should be noted that the examples depicted in the Figs. are not limited to a particular circular or polygonal shape of the electromagnetic actuators 1a . . . 1d and their parts. Instead, the shape of the electromagnetic actuators 1a . . . 1d in top view is interchangeable.

It should also be noted that the invention is not limited to the above-mentioned embodiments and exemplary working examples. Further developments, modifications and combinations are also within the scope of the patent claims and are placed in the possession of the person skilled in the art from the above disclosure. Accordingly, the techniques and structures described and illustrated herein should be understood to be illustrative and exemplary, and not limiting upon the scope of the present invention. The scope of the present invention is defined by the appended claims, including known equivalents and unforeseeable equivalents at the time of filing of this application. Although numerous embodiments of this invention have been described above with a certain degree of particularity, those skilled in the art could make numerous alterations to the disclosed embodiments without departing from the spirit or scope of this disclosure.

LIST OF REFERENCES

1a . . . 1e electromagnetic actuator
2 plate like structure (display)
3a . . . 3c annular coil arrangement
4, 4a, 4b voice coil
5 glue layer
6a . . . 6e magnet system
7a . . . 7e top plate
8a . . . 8e bottom plate
9a . . . 9e center magnet
10a . . . 10e outer ring (fixed part of the magnet system)
11a . . . 11e movable part of the magnet system
12a . . . 12g spring
13a . . . 13g spring arrangement
14a . . . 14e annular outer holder
15a . . . 15f center holder
16a, 16b center connector
17 top mounting plate
18 bottom mounting plate
19 adhesive sheet/glue layer
20a . . . 20e output device
21 ring cover
22 distinct outer holder
23 combined holder
24 annular section of combined holder
25 center section of combined holder
26 connecting section of spring
a, a' air gap between the movable part of the magnet system and the center connector
a" air gap between the movable part of the magnet system and the outer ring
b . . . b" air gap between the movable part of the magnet system and the annular coil arrangement
A actuator axis
B, B1, B2 magnetic field
S sound emanating surface

What is claimed is:

1. An electromagnetic actuator, configured to be connected to a backside of a plate structure opposite to a sound emanating surface of the plate structure, the electromagnetic actuator comprising:
    an annular coil arrangement comprising a first voice coil and a second voice coil arranged above the first voice coil; and
    a magnet system configured to generate a magnetic field transverse to a longitudinal direction of a wire of the annular coil arrangement wound around an actuator axis, wherein the annular coil arrangement and the magnet system are connected to each other by a plurality of springs, the plurality of springs being arranged inside of the annular coil arrangement, and wherein the magnetic field passes the first voice coil from the inner side of the annular coil arrangement to the outer side of the annular coil arrangement, and the magnetic field passes the second voice coil from the outer side of the annular coil arrangement to the inner side of the annular coil arrangement.

2. An electromagnetic actuator, configured to be connected to a backside of a plate structure opposite to a sound emanating surface of the plate structure, the electromagnetic actuator comprising:

an annular coil arrangement;

a magnet system configured to generate a magnetic field transverse to a longitudinal direction of a wire of the annular coil arrangement wound around an actuator axis;

a plurality of springs arranged inside of the annular coil arrangement, wherein the annular coil arrangement and the magnet system are connected to each other by the plurality of springs; and at least one spring arrangement comprising a combined holder with an annular section and an additional center section, wherein the plurality of springs extend from the center section and have a connecting section at their extending ends inside of the annular section, wherein the annular coil arrangement and/or at least a part of the magnet system, is fixedly arranged relative to the plate structure when the electromagnetic actuator is connected to a backside of the plate structure.

* * * * *